Figure 1:
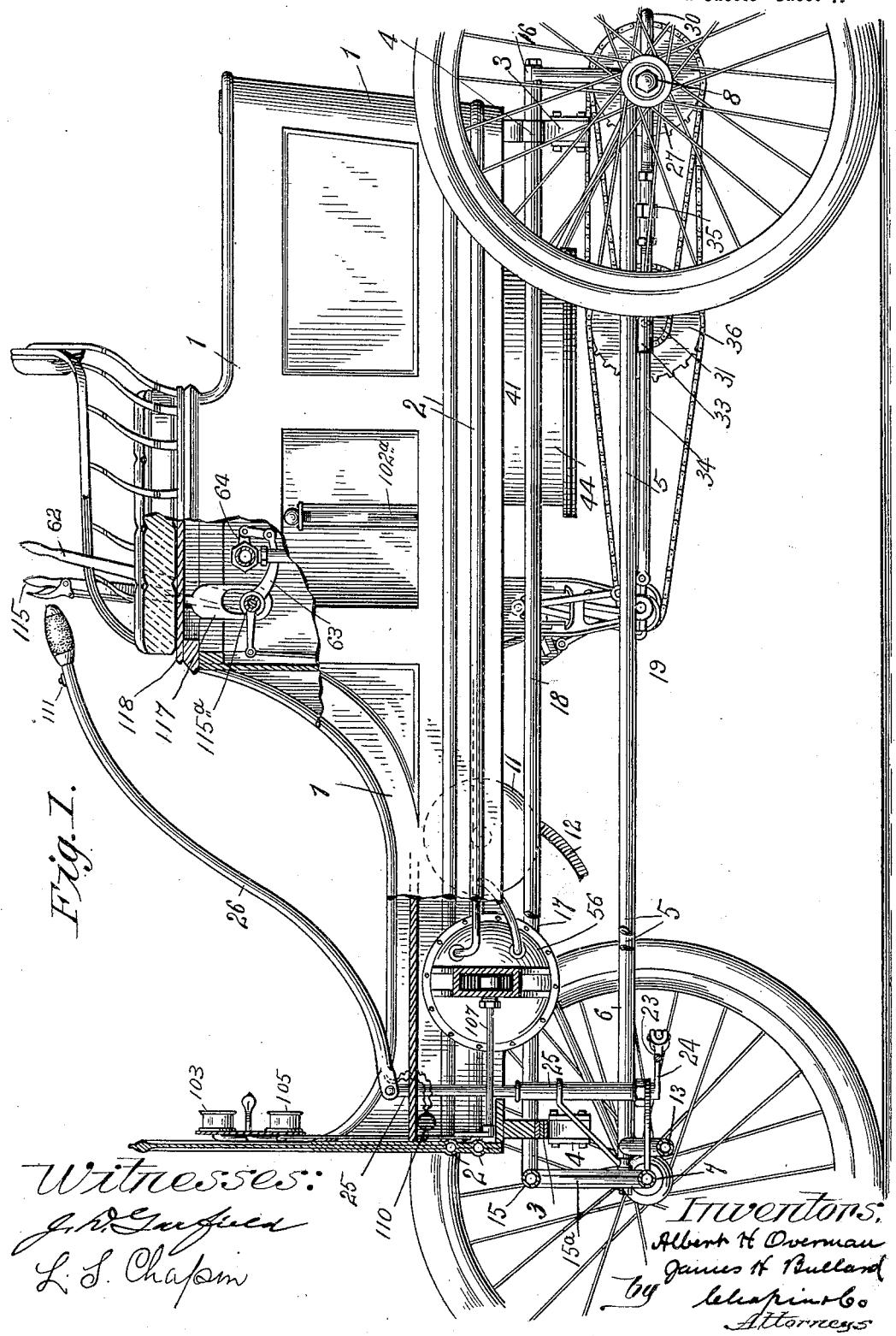

No. 648,286. Patented Apr. 24, 1900.
A. H. OVERMAN & J. H. BULLARD.
MOTOR VEHICLE.
(Application filed July 28, 1899.)
(No Model.) 11 Sheets—Sheet 1.

Fig. I.

Witnesses:
J. R. Garfield
L. S. Chapin

Inventors:
Albert H. Overman
James H. Bullard
by Chapin & Co.
Attorneys

THE NORRIS PETERS CO., PHOTO-LITHO., WASHINGTON, D. C.

No. 648,286. Patented Apr. 24, 1900.
A. H. OVERMAN & J. H. BULLARD.
MOTOR VEHICLE.
(Application filed July 28, 1899.)
(No Model.) 11 Sheets—Sheet 2.

No. 648,286. Patented Apr. 24, 1900.
A. H. OVERMAN & J. H. BULLARD.
MOTOR VEHICLE.
(Application filed July 28, 1899.)

(No Model.) 11 Sheets—Sheet 3.

Witnesses: Inventors,

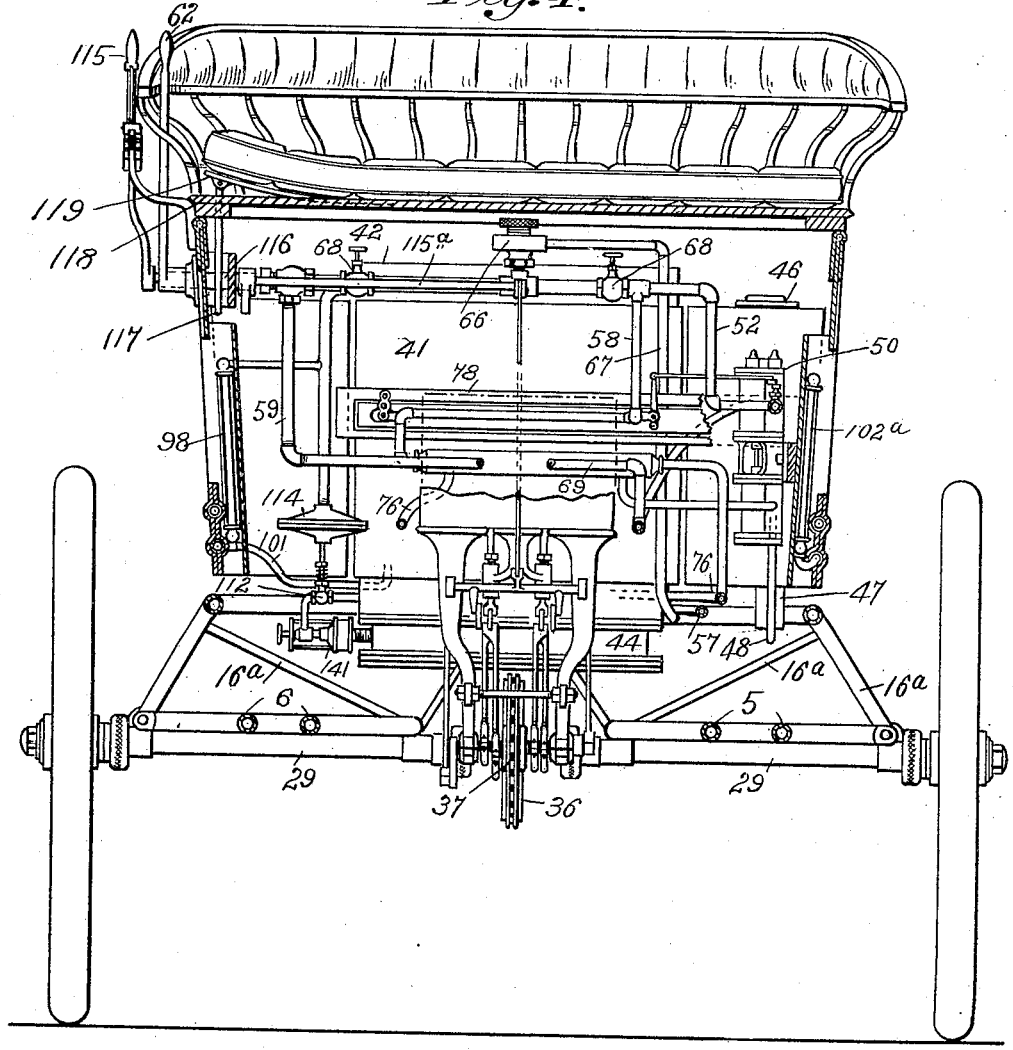

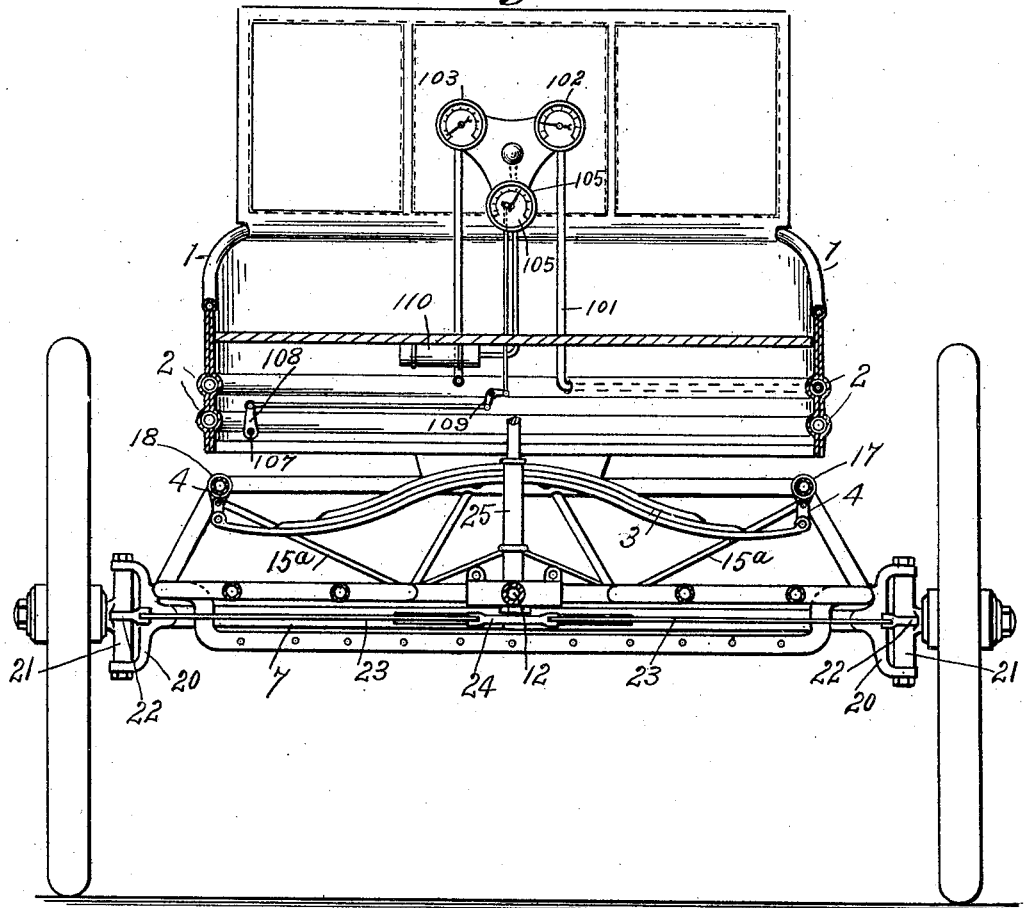

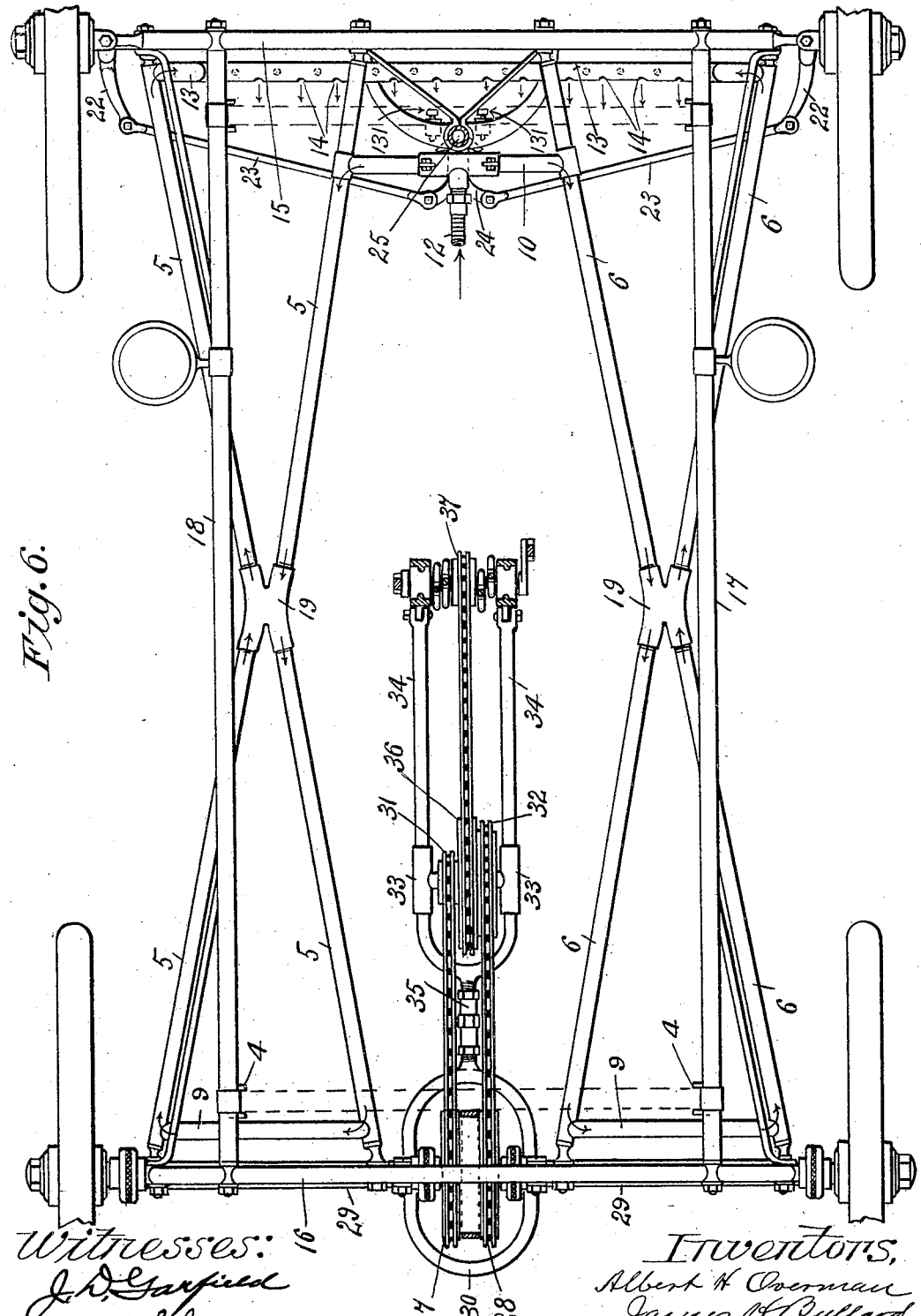

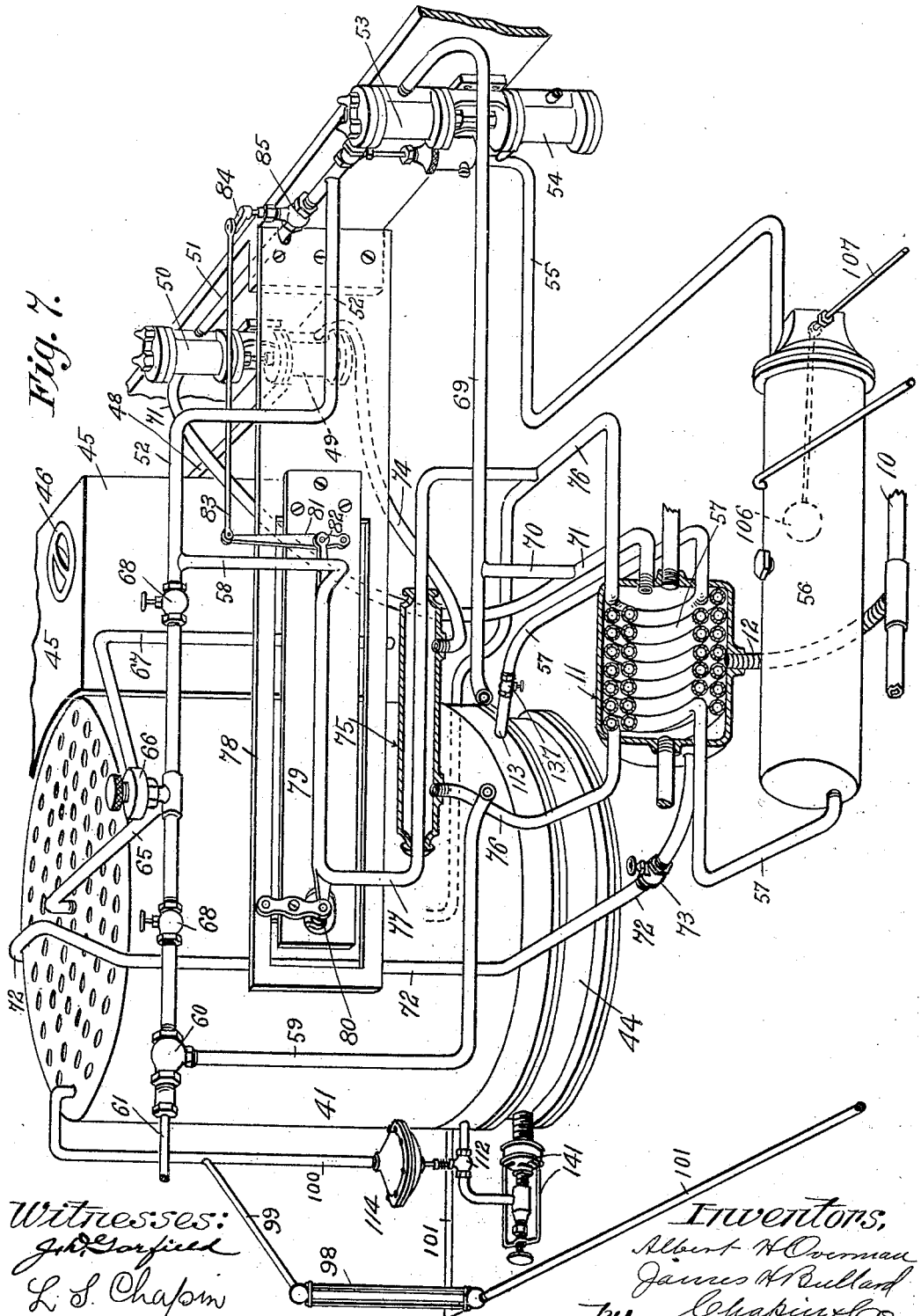

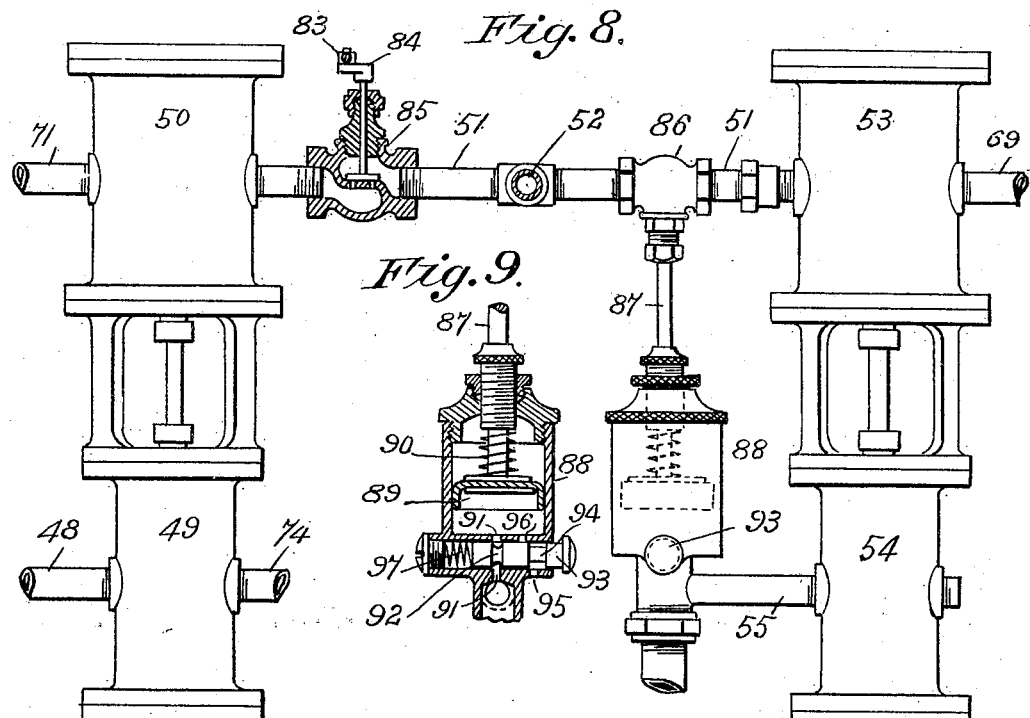

No. 648,286. Patented Apr. 24, 1900.
A. H. OVERMAN & J. H. BULLARD.
MOTOR VEHICLE.
(Application filed July 28, 1899.)
(No Model.) 11 Sheets—Sheet 9.
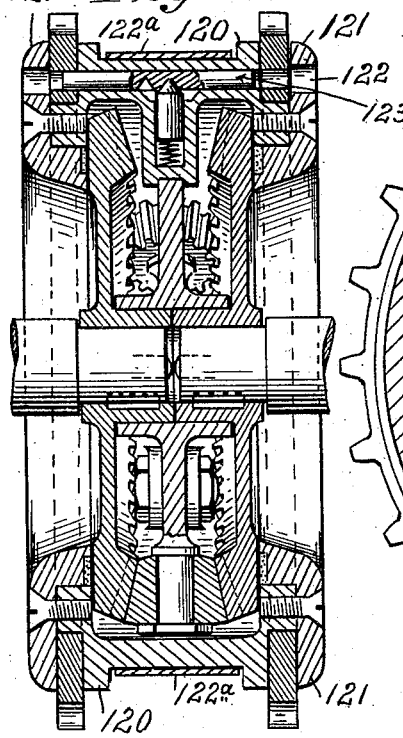
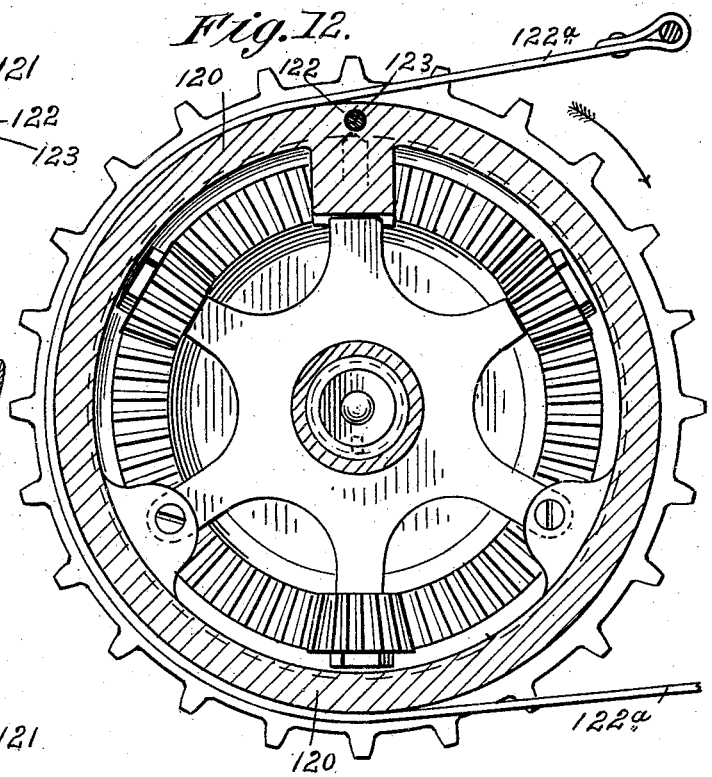
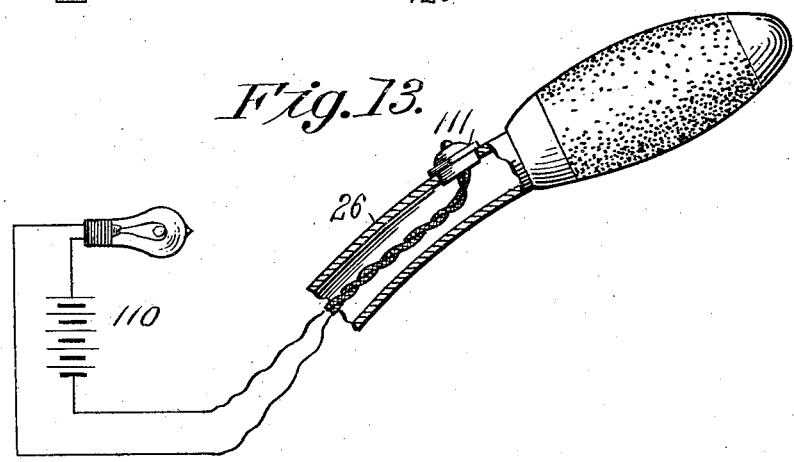
Witnesses:
Inventors:
Albert H Overman
James H Bullard
by Chapin & Co
Attorneys.

No. 648,286. Patented Apr. 24, 1900.
A. H. OVERMAN & J. H. BULLARD.
MOTOR VEHICLE.
(Application filed July 28, 1899.)
(No Model.) 11 Sheets—Sheet 10.
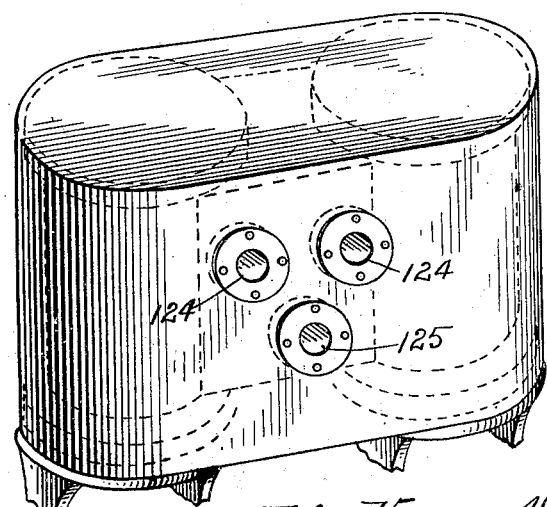
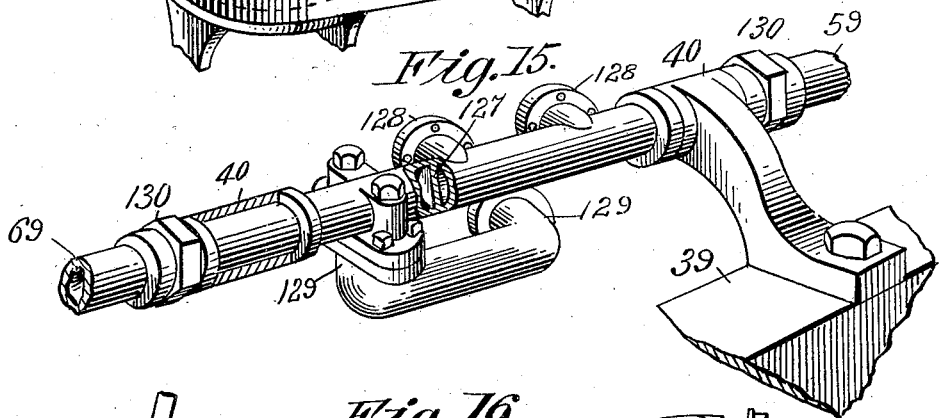
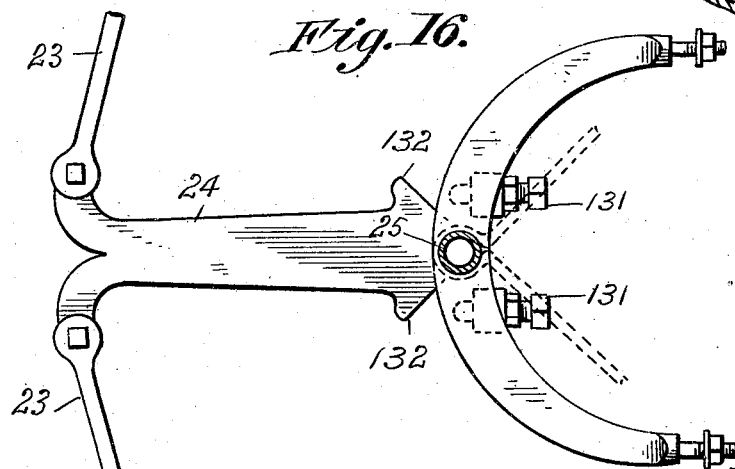
Witnesses:
Inventors:
Albert H Overman
James H Bullard
by Chapin & Co
Attorneys.

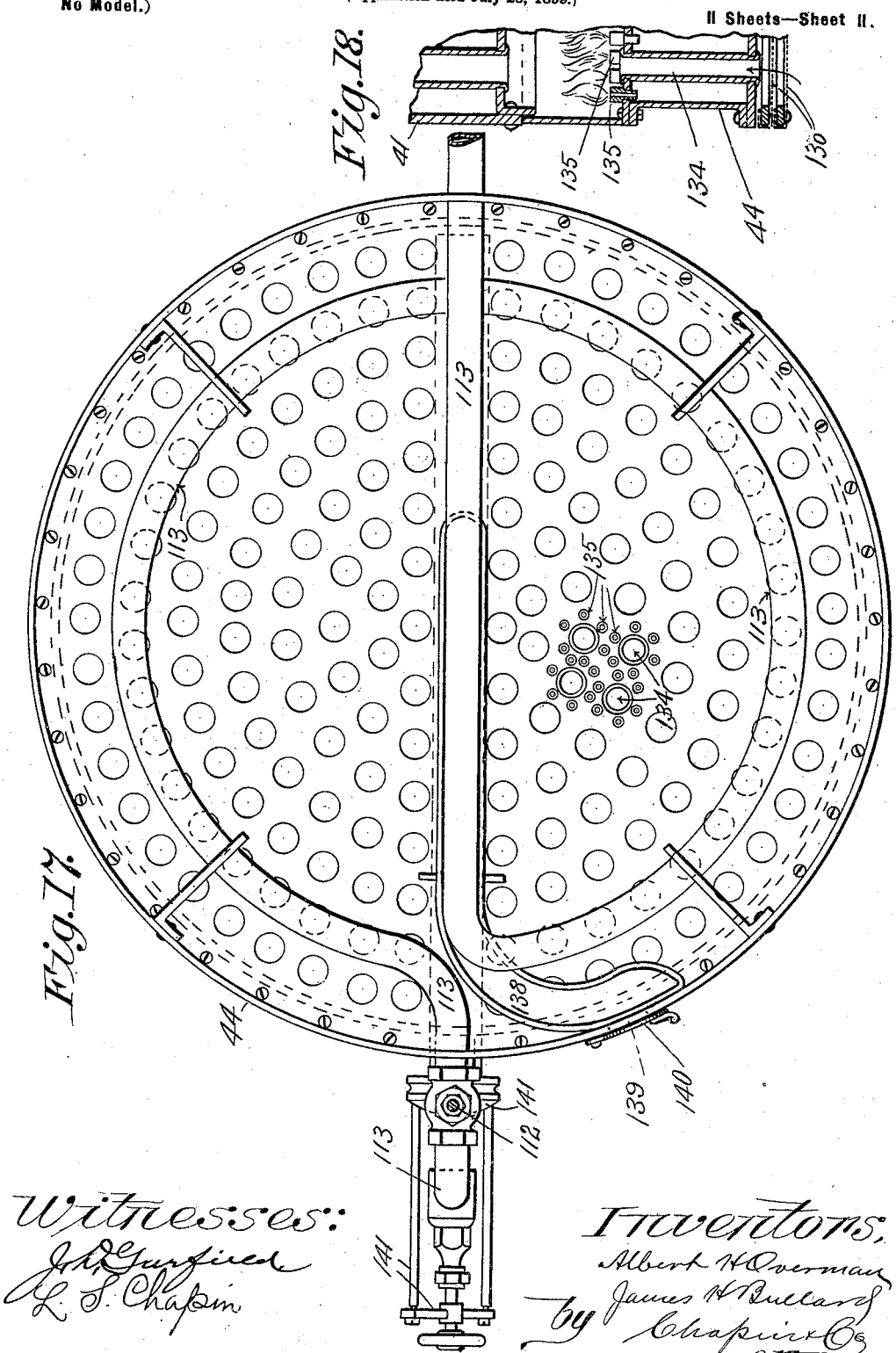

UNITED STATES PATENT OFFICE.

ALBERT H. OVERMAN AND JAMES HUBERT BULLARD, OF SPRINGFIELD, MASSACHUSETTS.

MOTOR-VEHICLE.

SPECIFICATION forming part of Letters Patent No. 648,286, dated April 24, 1900.

Application filed July 28, 1899. Serial No. 725,406. (No model.)

*To all whom it may concern:*

Be it known that we, ALBERT H. OVERMAN and JAMES HUBERT BULLARD, citizens of the United States of America, residing at Springfield, in the county of Hampden and State of Massachusetts, have invented new and useful Improvements in Motor-Vehicles, of which the following is a specification.

This invention relates to automobile vehicles of that class in which steam or other elastic vapor is produced in a suitable generator and conveyed to a suitable motor, whereby the expansive pressure of said vapor is utilized through suitable driving connections with an axle of the vehicle for driving the latter.

This invention has for its object the perfecting of the construction of mechanisms and devices and their coöperative arrangement in connection with the generator and motor of said vehicles, whereby the principal functions of the said vapor-generator and motor are automatically performed and the vehicle thereby rendered safe of operation by persons relatively unskilled in the use and construction of such mechanism as constitute the motive power of automobile vehicles; and the invention consists in the construction set forth in the following specification and pointed out in the claims forming part thereof.

Many of the specific devices claimed in this machine are the subjects of separate patents, being related to different arts. We desire to give full information relating to our invention and have herein described and illustrated parts which by the ruling of the Patent Office we are not permitted to claim specifically herein. We desire to claim in this case such parts as relate to the vehicle as a whole and such modifications of parts as we have devised expressly to adapt devices used in various arts for use in this class of vehicles, and we illustrate our invention in its entirety to the end that there shall be no question of such disclosure as to enable persons skilled in this art to make and use this invention, reserving, however, such parts of our own invention as have been claimed or under the rulings of the Patent Office must be claimed in separate applications.

Figure 2:
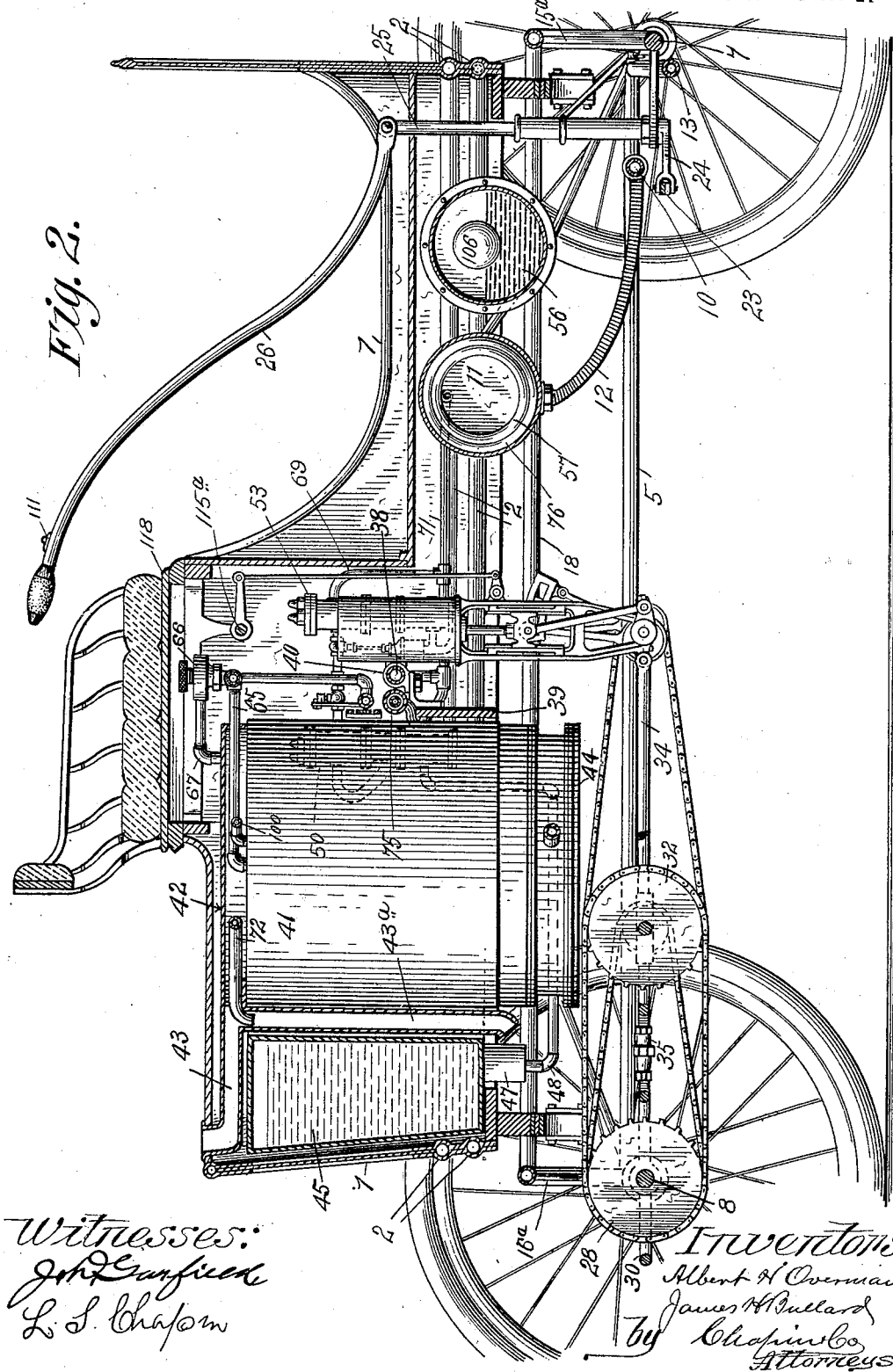
Figure 3:
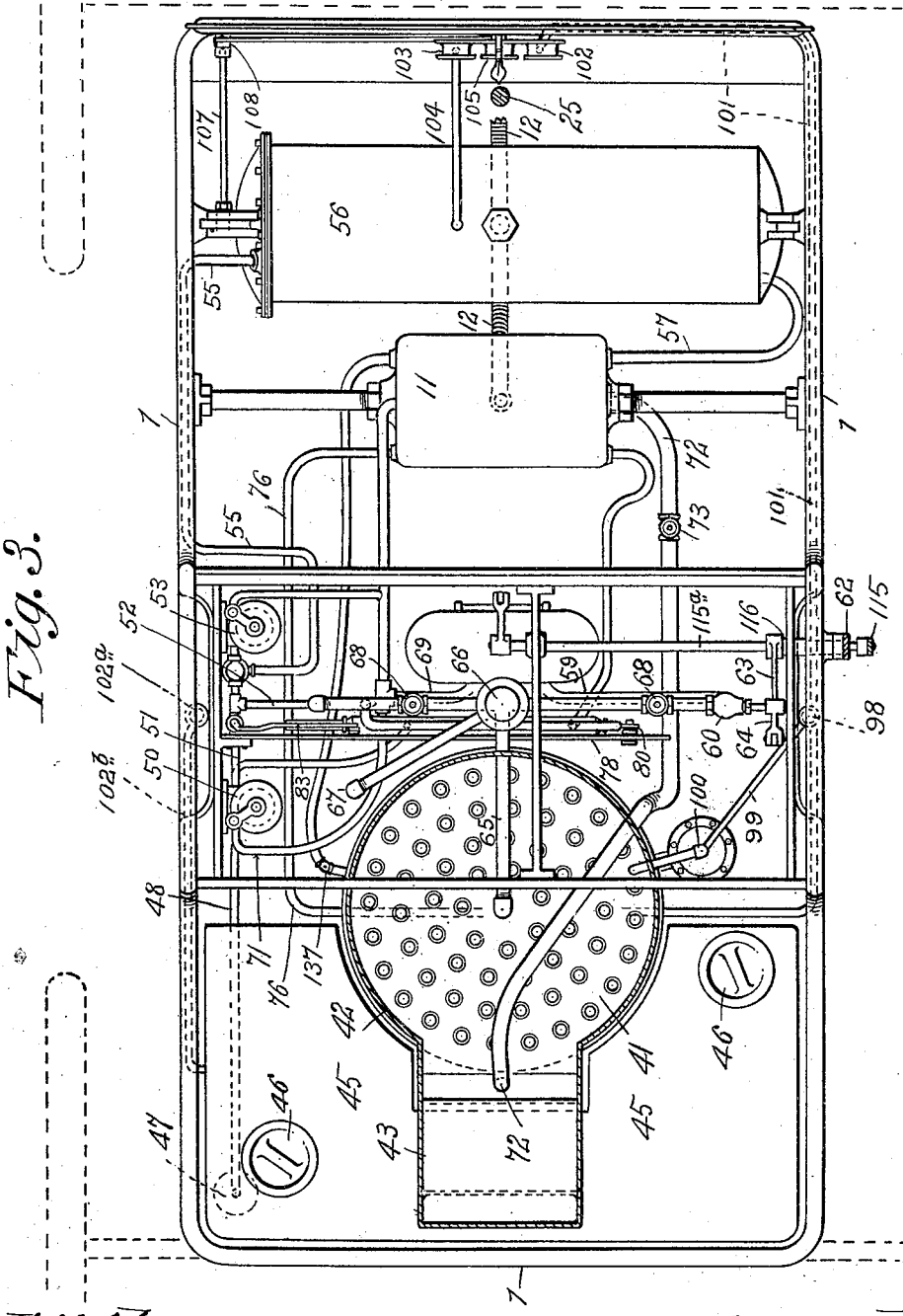

In the drawings forming part of this specification, Figure 1 is a side elevation of an automobile vehicle embodying this invention, parts thereof being broken away. Fig. 2 is a longitudinal section of same looking from the opposite side. Fig. 3 is a plan view with the seat and top of the body removed. Fig. 4 is a cross-section on line A A, Fig. 2, looking toward the rear end of the vehicle. Fig. 5 is a similar sectional view on line B B, Fig. 2, looking toward the front end of the vehicle. Fig. 6 is a plan view of the frame and running-gear of the vehicle with the body removed. Fig. 7 is a perspective view of the generator and its burner, the water and air pumps, fuel-tank, water-heater, and practically the entire circulatory system of the vehicle. Fig. 8 is an elevation of the feed-water and air pumps and the connection between them, showing the feed-pump valve in section. Fig. 9 shows in vertical section the pressure-actuated device for cutting off steam from the steam-cylinder of the air-pump. Fig. 10 is a perspective view of devices for automatically locking the throttle-lever when the vehicle is not occupied. Fig. 11 is an enlarged sectional view of the differential gearing transversely of the plane of its rotation on line C C, Fig. 12. Fig. 12 is a sectional view of same in a plane at right angles to Fig. 11 on line D D, Fig. 11, on same scale as Fig. 11. Fig. 13 shows, on an enlarged scale, the application of a push-button to the steering-lever for lighting an electric lamp. Fig. 14 is a detailed view of the rear side of the engine-cylinders. Fig. 15 shows the rocking support of the engine and shows the entrance of live steam and the exit of the exhaust through said support. Fig. 16 shows, on an enlarged scale, adjustable stops on the frame for limiting the throw of the steering-lever horizontally. Fig. 17 illustrates, on an enlarged scale, in plan view, the type of hydrocarbon vapor-burner employed. Fig. 18 shows in vertical section a portion of one side of said burner.

The ordinary steam-engine has long been recognized as possessing many advantageous characteristics as a propelling-motor for automobile vehicles, and efforts attended by more or less success have been made to overcome its obvious disadvantages. The latter have heretofore consisted, mainly, in the watchful care necessary to maintain a proper supply of water in the steam-generator and to prevent the over-production of steam when the exigencies of the road do not require it and in the regulation of the combustible used to generate the steam, whereby normal steam-pressure may be maintained whatever may be the demands of the motor. The present invention aims to overcome these objections by a construction in which these fundamental operations are automatically performed without the assistance of the operator or driver and whereby the latter has only to provide for a suitable supply of water in the storage-tanks provided therefor and a suitable supply of liquid fuel in the tank provided for it, thus rendering the vehicle manageable by a person having practically no technical knowledge of engines or boilers.

The advantage in the use of a steam-engine as a driving-motor consists in the facility of obtaining water for the boiler and kerosene or similar liquid hydrocarbon for fuel when on the road and in the fact that the repairing of such engines is within the capacity of any machine-shop. Furthermore, hydrocarbons may be burned under a generator so perfectly that no odor results from the combustion thereof, and all of the difficulties attendant upon the use of the explosive hydrocarbons in the cylinders of a motor are avoided, such as the neutralization of the great heat generated in the cylinders, the consequent difficulty in properly lubricating the same, and the disagreeable odor resulting from the exhaustion of the products of hydrocarbons exploded in the cylinders of said motor.

In carrying out this invention the wagon-body 1 is constructed of any desired shape adapted to receive and properly support the generator, motor, and various tanks and appliances incidental thereto. This body is preferably made of sheet metal, no wood being used where it would be subjected to the warping action of heat. Parts of the sides and ends of the body are made of two thicknesses of metal, as seen in Figs. 1, 2, 4, and 5, in each of which are formed the flutes 2, oppositely located, whereby when said two parts are placed face to face tubular passages are provided, within which certain of the pipe connections may be located, and as many of these flutes may be provided as desired.

For the sake of clearness many of the pipes shown herein have been located where they would be plainly seen, and the flutes 2 referred to have been shown as only two in number.

In practice those pipes not located in the flutes would be laid alongside the vehicle-body as far as possible, whereby the space around the working parts of the mechanism would be left as free as possible. Furthermore, no elbows or T couplings have been shown, as the scale on which the drawings have been made will hardly permit it.

The body of the wagon is supported on suitable springs 3 in the usual manner, the said springs being pivotally suspended by their ends from the side-bars of the frame at 4. (See Figs. 5 and 6.) The said frame is shown in plan in Fig. 6, in side elevation in Fig. 1, and in section in Figs. 4 and 5, and consists of two diagonally-disposed tubular members 5 and 6 on each side, to the ends of which are rigidly secured by suitable clips the front and rear axles 7 and 8. Between the rear ends of said tubular members 5 and 6 are the transverse tubular members 9, and between the two inner ends of the said members 5 and 6 at the forward end of the frame is located the tubular member 10, which is connected with the drum 11 by a flexible pipe 12. Said drum is the feed-water and fuel heater, and will be referred to farther on. The forward outer extremities of the said members 5 and 6 enter opposite ends of a tube 13, parallel with and slightly below the front axle 7. This tube is supported by said members 5 and 6, and along the rear side and under side thereof are a number of holes 14.

The several above-described tubes 5 and 6 provide a circuitous passage for the exhaust-steam as it issues from the drum 11, which passages, starting from the junction of the pipe 12 with the tube 10 and branching right and left from that point, is the same on both sides of the frame and comprises the inner members of the diagonal tubular members 5 and 6 and the rear transverse tubes 9, leading into the outer members of the said tubes 5 and 6, whose forward ends are connected with the forward perforated tube 13. The exhaust-steam travels thus twice the length of the wagon and partially across both ends thereof before it can escape to the open air, and previous to its issue from the drum 11 a part of it will have been condensed by contact with the interior of said drum.

A truss-frame 15 is located over the front axle 7 and a second truss-frame 16 over the rear axle 8, said frames being attached by their lower extremities to the said axles near the wheels thereof. The form of these trusses is shown in Figs. 4 and 5. At each corner of the trusses, formed by the meeting of the inwardly and upwardly inclined part with the horizontal part thereof, there is secured in a suitable manner the horizontal and parallel side bars 17 18, on which the springs 3 are secured, as already described. Suitable diagonal braces 15ª and 16ª are provided to strengthen said trusses, as shown in Figs. 4 and 5.

The parts referred to as the "diagonally-disposed tubular members" 5 and 6 on each side of the frame consist of four tubes, each loosely screwed into the cross-coupling 19 midway between the axles, whereby a certain degree of diagonally-torsional movement of the frame will be possible without putting any strain on the latter. By the term "loosely screwed" is meant that said tubes are screwed up to a stop in the coupling 19 and then turned back one-quarter turn, approximately, to the end that said members of the tubes 5 and 6 may have some degree of movement in said coupling.

A certain amount of movement in said frame construction, as described, is desirable, but only a small amount, and the location of the truss-frames over the axles and the side bars uniting said frames, between which there is also a little yielding to torsional movement, together with the axles of the vehicle, forms a construction of such rigidity that beyond the slight above-referred-to diagonal movement thereof it is rigid enough to hold up the weight of one of the wheels unsupported.

The ends of the front axles 7 are provided with the vertically-placed yokes 20, (see Fig. 5,) between the ends of which the short T-shaped pieces 21 are pivoted, on one arm of which the wheel is mounted in the manner usual in constructions of this class, steered by swinging the wheels instead of the axle. Steering devices are provided by an arm 22, projecting rearwardly from each of the said pieces 21, and rigid connections 23, pivoted to the ends thereof, reaching therefrom to a horizontal Y-shaped lever 24, to the two arms of which said connections 23 are pivoted, said lever 24 being secured to the lower end of a steering-post 25, supported in a bracket on the forward axle and the frame. Said steering-post extends through the floor of the vehicle-body and has a steering-lever 26 pivoted thereto for a free swinging movement in a vertical plane. By swinging it horizontally the wheels may be swung diagonally to the front axle in either direction to steer the vehicle.

The rear axle 8 of the vehicle is in two parts, and between its inner ends, midway between the rear wheels, is located the usual differential gearing. This is constructed as shown in Figs. 11 and 12, and is provided with two sprockets 27 and 28, only one of which is connected positively with the gearing at any time for driving said axle parts, the other running free.

To the rear ends of the tubular members 5 and 6 are secured two sleeves 29, and in these are located the two parts of the axle above referred to. The rear wheels are attached directly to these axle parts, which latter rotate in said sleeves, the usual ball-bearings being provided at each end of said sleeves. The inner ends of the latter are united by a yoke 30.

The intermediate sprockets 31 and 32, over which the chains from the axle-sprockets run, are fixed on a sleeve adapted to rotate on a shaft supported on and uniting two sleeves 33 33, having a sliding movement at right angles to the axle on the arms of a fork 34, extending between the said yoke 30 and the engine, to which the arms of said fork are pivotally attached. A right and left hand threaded coupling 35 unites the stem of the fork 34 with a stem on the said yoke 30. The said sprockets 31 and 32 are of different diameters, and as either one of the sprockets on the rear axle may be used for driving means are thus provided for using either one of the two speeds which the said sprockets 31 or 32 will give. Between said sprockets a sprocket 36 is secured, which is connected by a chain with the sprocket 37 on the crank-shaft of the engine. The latter is supported pivotally at 38 on a bar 39, (shown only in Figs. 2 and 15,) which extends transversely of the body of the vehicle and which is omitted from the other figures of the drawings, where it would be seen, for the sake of clearness. This pivotal support of the engine permits the lower end thereof to be swung slightly by the operation of the said coupling 35, whereby the drive-chain from the engine to the sprocket 36 may be adjusted to a proper tension.

By the construction of the parts supporting the intermediate sprockets the manipulation of the coupling 35 operates to tighten either the drive-chain between the engine and intermediate sprockets or between the latter and the sprockets on the rear axle, for as the fork 34 is moved away from the yoke 30 it will swing the engine toward the front axle and tighten the chain between the engine and the intermediate sprockets, and when the chains between the latter and axle are slack the shaft hung on the sleeves 33 will be drawn away from the rear axle, thus tightening said chains.

The engine shown in this construction is of the ordinary two-cylinder inverted type, connected directly with the crank-shaft, on which, as stated, is fixed the sprocket 37. This type of engine is not essential, however, and forms no part of the invention, and the only requisite of any other type which may be substituted therefor being the capability of swinging in a plane transverse to the axles to provide for the taking up of the slack of the drive-chains above described. The bearings 40, on which the engine swivels, and the tubular connections therein are illustrated in Fig. 15, and through these connections the steam is admitted to the engine at one point and the exhaust escapes through another, which will be described more fully farther on.

A steam-boiler 41 is provided for the generation of steam for the engine. The boiler shown herein is of the common vertical-tube type. Any style of boiler may be employed. A hood 42 covers the top thereof and a flue 43 from said hood leads to the rear end of the vehicle-body, a second flue 43$^a$ (shown in Figs. 2 and 3) extending from under the hood close to the boiler downward to a point below the bottom of the vehicle, and into this second flue a pipe is introduced, whereby the exhaust-steam of the engine may be forced through said flue if desired. A burner 44, adapted to the consumption of vaporized hydrocarbons, is supported under said boiler 41 in any suitable manner to insure the contact of the flames thereof with the bottom of the boiler. This burner is shown in Figs. 17 and 18 of the drawings, and a detailed description thereof is not necessary, as its construction forms the subject of a separate application for a patent to be filed therefor. The description of such parts of the burner that have a bearing on this application will be given farther on.

A water tank or reservoir 45 occupies the space in the body of the vehicle near and back of the boiler and is provided with suitable openings for the introduction of water, which openings are closed by suitable caps 46. At any point at the bottom of said tank a pocket or depression 47 is placed, covered by a piece of fine-wire cloth to exclude any foreign substances therefrom, and the water for the boiler is drawn from said depression.

A pipe 48 leads to the suction-cylinder 49 of a feed-pump secured to the side of the body or other convenient support. The steam-cylinder 50 of said feed-pump receives steam from the boiler 41 through the pipe 51, into which a pipe 52 enters, which is connected directly with the boiler. (See Fig. 7.) Said water-tank 45, owing to the restricted space in the body of a vehicle, must from necessity be placed near the boiler, and to prevent as much as possible the absorption of heat from the latter an air-space between said tank and the boiler and the draft-flues is provided, as shown in Figs. 2 and 3. This space may, if desired, be filled with mineral wool or asbestos to more perfectly insulate said part. For reasons set forth farther on it is desirable to keep the water in said tank at as low a temperature as possible. Said pipe 51 not only supplies steam to said feed-pump, but also to the steam-cylinder 53 of an air-pump, whose pumping-cylinder 54 is connected by a pipe 55 with the upper part of a reservoir 56, supported near the forward end of the vehicle, whereby means are provided for forcing the liquid fuel contained therein through a pipe 57 to the burner 44. This last-named pipe on its way to the burner passes through the drum 11, which receives the exhaust-steam from the engine and pumps and is therein heated before it reaches the burner. To raise said fuel to a desired temperature, said pipe 57 may be formed into a coil in said drum, whereby the exposure of the fuel to the high temperature of said drum may be of such duration as will impart the desired temperature thereto. The pipe 52 not only serves to convey steam to the feed-pump and air-pump, as described, but, besides this duty, it conveys, by a branch 58, steam to the thermally-actuated mechanism, whereby feed-water is supplied to the boiler, and by means of another branch 59 supplies steam to the engine or motor. Both of these branches 58 and 59 are shown clearly in Figs. 3, 4, and 7 of the drawings. At the junction of the branch 59 with said pipe 52 is a throttle-valve 60, the stem 61 of which is rotated to open and close it by a throttle-lever 62, an arm 63 on the hub of said lever having a link connection, as shown in Fig. 1, with a crank-arm 64 on the end of the said valve-stem 61. A branch pipe 65 connects the pipe 52 with the boiler 41, and at the junction of said pipes is shown a safety-valve 66, having a pipe 67 leading down underneath the vehicle. Valves 68 are preferably placed in said steam-pipe 52 substantially at the points shown, whereby steam may be shut off from either the engine or the automatic boiler-feed devices or pumps.

As previously stated, steam enters the engine through the bearings 40, on which the engine is supported, and the exhaust leaves the engine through another part of the same bearings. The said exhaust from the engine and the exhaust from the steam-cylinder 53 of the air-pump enter the same pipe 69, which by a short branch 70 connects with the pipe 71, which leads from the exhaust end of the steam-cylinder of the feed-pump to the drum 11, into which all of the exhaust-steam enters. There are two pipes leading into the said drum through which steam may escape from the latter—viz., the pipe 12, whose functions have already been described, and a pipe 72, extending backward and over the boiler and having its open end turned downward and introduced into the said flue 43$^a$, whereby, if desired, the exhaust-steam from the heating-drum 11 may be directed down through said flue 43$^a$ to produce an artificial draft of air upward through the burner 44 and the flues of the boiler. This disposition of the exhaust is sometimes rendered necessary when the vehicle has a following wind whose velocity is equal to or exceeds the rate of travel of the vehicle. Under such circumstances the flue 43 is either "dead" or the force of the wind may be sufficient to cause a reverse current down the flues of the boiler and cause the flame of the burner to be extinguished or rendered ineffective for the proper generation of steam. A valve 73, Fig. 3, in said pipe is located at any point convenient to the hand of the operator. The said heating-drum 11 may be supported in any convenient manner and at any convenient point on the vehicle, whereby the various pipe connections may be most easily and conveniently made therewith. One of the functions of said drum—viz., the heating of the hydrocarbon before the latter reaches the burner—has been described. Its second function is to impart heat to the feed-water. This use of the exhaust largely reduces the amount of steam which otherwise would pass into the tubular members 5 and 6 of the frame.

As stated above, a pipe 48 connects the water-tank 45 with the suction end of the pumping-cylinder 49 of the feed-pump, and from the delivery end of the said cylinder a pipe 74 extends to one end of a jacket 75, inclosing a part of the thermally-actuated mechanism whereby the feed-pump is controlled and whose operations will be described farther on. From the opposite end of said jacket a pipe 76 (which is practically a continuation of the pipe 74) extends to and enters the drum 11, wherein said pipe is coiled, and passing out through the opposite end of the drum extends to and enters the under side of the boiler. Thus when the feed-pump is in operation the cold water passes through the pipe 74, the jacket 75, the pipe 76, through the coil in the drum 11, where it is heated, and thence to the boiler. The water resulting from the condensation of steam in the drum 11 finds an exit through the pipe 12 to the condenser-tubes, which form part of the frame heretofore described.

To obviate the necessity of constant watchfulness on the part of the driver of the vehicle to see that a proper quantity of water is always maintained in the boiler, an automatically-operating mechanism has been applied to this construction, which is actuated by the alternate contact of steam and water with a thermally-actuated device that starts and stops the feed-pump which supplies water to the boiler, and the said alternate contact of water and steam with said device is effected by the rise and fall of the water-level in the boiler. This thermally-actuated device forms the subject of Letters Patent of the United States, dated February 13, 1900, No. 643,319, granted to James H. Bullard. It occupies an important place in the combination of devices which forms the subject of this application, however, and comprises an expansible and contractible tubular U-shaped member 77, the two arms of which are substantially parallel and the upper arm of which lies a little below the plane of the normal water-level of the boiler and is connected with or forms a continuation of the pipe 58, which has a direct connection with the steam-space of said boiler. The opposite arm of said expansible U-shaped member passes through the water-jacket 75, and from thence enters the pipe 76, (see Figs. 3 and 7,) which is directly connected with the water-space of said boiler, thus equalizing the pressure in said expansible member, whereby the rise and fall of the water in the boiler will cause a like rise and fall in said member. The said member 77 is supported on a metal base supported by one end thereof on the wagon-body 1, as shown in Figs. 1, 3, and 4 of the drawings. To provide against the disarrangement of the adjustment of the thermally-actuated devices by reason of the expansion and contraction of the base of said member 77, on which they are supported, the said base is made in two parts 78 and 79 of different metals, whereby the expansion of one of them is offset by the different degree of expansion of the other, and a stable point of support 80 is thus provided for the expansible member 77, against which the latter may act to move its opposite end, to which is connected the valve-operating devices. These devices consist in a lever 81, pivoted by one end at any convenient point near the fixed end of said two-part base which supports the member 77, and a pivotal connection 82 is made between the ends of an arm of said member which is connected with the pipe 58. The opposite end of said lever 81 is connected with the rod 83, which extends to and is pivotally connected with a crank 84 on the stem of a valve 85 in the steam-pipe 51, located in the latter, between the connection thereof with the pipe 52 and the steam-cylinder 50 of the feed-pump. Fig. 8 illustrates the type of valve preferably used in connection with the said expansible U-shaped member 77. This is a "disk-valve," so-called, and opens to its maximum extent by a very slight rotatory movement of the valve-stem and is a well-known type. By reason of the location at the arm of the member 77, which is connected with the pipe 58 just below the normal level of the water in the boiler, it is evident that normally said arm will be filled with water, and as the level lowers the said arm of said member will be vacated by the water therein and said arm will be filled with steam from the pipe 58, which being of a much higher temperature will expand said arm of said member 77 and will cause the lever 81 to be swung, whereby the stem of the valve 85 will be rotated sufficiently to open the latter and allow steam from the pipe 52 to enter the cylinder 50 of the feed-pump and operate it to force water into the boiler through connections with the pumping end of said feed-pump above described. The rise of the level of the water in the boiler due to the operation of the feed-pump will cause a like rise of the water in the tubular expansible member 77, gradually forcing the steam out of the said member and causing the contraction of the latter and the consequent closing of the valve 85, thus stopping the feed-pump.

The quickness of operation of the above-described valve-operating devices is dependent upon the difference of temperature between the steam and water, which alternately occupy the expansible member 77, and to make that difference as marked as possible the jacket 75 is fitted over that arm of the said member 77 through which the water first flows from the boiler or feed-water heater when the feed-pump is in operation, and all the water drawn from the tank 45 by said feed-pump passes through said jacket 75, and thus reduces the temperature of the water passing through the arm of the member 77 within said jacket. It is for the purpose of reducing as much as possible the temperature of the water, as above described, that the tank 45 is separated from or insulated from the boiler, as hereinbefore stated. The construction of the said supporting-base for the expansible member 77, whereby the expansive movements of said base are neutralized, and the provision of means for cooling the water which enters said member, all as heretofore described, are features of very great importance in the construction of steam-operated automobile vehicles on account of the very considerable degree of heat to which these parts are subjected, owing to the necessity of placing them in close proximity to the boiler. Without these provisions the degree of opening movement of the valve 85 is not uniform and the expansible member 77, which operates said valve, is slow in its action, whereas owing to the limited quantity of water carried in the boiler and its great evaporating-surface it is essential that these movements should take place with percision and uniformity. The said reservoir 56, as stated, contains liquid hydrocarbon, which is forced to the vaporizing-burner 44 by means of air under pressure supplied to said tank by a steam-actuated air-pump connected therewith by the said pipe 55. A device for automatically maintaining said air at a constant pressure is provided and illustrated in detail in Fig. 8. In the steam-pipe between the pipe 52 and the steam-cylinder 53 of said air-pump is a valve 86, whose stem 87 extends into a cylinder 88, within which is a piston-head 89, secured to the end of said valve-stem. Between the head of the cylinder and said piston-head is a spring 90, the tension of which holds said valve open, and under these conditions the pump will operate to force air through the pipe 55 to the reservoir 56. When the desired pressure is attained in the said reservoir, the spring 90 will be compressed by the back pressure of air acting against the under side of the piston-head 89, whereby the valve-stem 87 will move endwise, closing said valve, the lower end of the cylinder 88 being connected with the pipe 55 to that end.

If for any reason it is desired to use the air-pump for compressing air to a degree beyond that which the resistance of the spring 90 will permit—as, for instance, in filling the pneumatic tires of the vehicle, for which purpose suitable connection may be made with the pipe 55—means are provided for closing the passage from said pipe to the cylinder 88 by means of the valve shown in Fig. 9. Normally said valve is in the position shown in said Fig. 9, and air from the pipe 55 may pass through the aperture 91 and the annular groove 92 in the plunger 93 into the cylinder 88. Near the outer end of said plunger is a second annular groove 94 therein, and leading into said groove from outside is an opening 95. A second opening 96 communicates with the interior of the cylinder 88 and is closed by the plunger when the passage from the pipe 55 is open into the cylinder. By moving the plunger endwise to the left the said last-named passage is closed and the opening 96 into the cylinder is put in communication with the opening 95, permitting air under the piston-head to escape. As long as air from the pipe 55 is prevented from entering the cylinder the air-pump will continue to operate, and any desired pressure within the limit of the boiler-pressure may be attained. Upon releasing the said plunger the spring 97 returns it to its normal position. (Shown in Fig. 9.)

The usual sight-gage 98 for indicating the height of the water-level in the boiler is provided and is located in a recessed panel on the side of the vehicle, whereby it is not liable to be accidentally broken, and is connected by a pipe 99 with the steam-pipe 100 and by a pipe 101 with the water-space in the boiler. Said pipe 101 is continued to the steam-pressure gage 102 on the dashboard of the vehicle. (See Fig. 5.) A suitable water-gage 102$^a$ for indicating the height of the water in the tank 45 occupies a similarly-recessed panel on the opposite side of the wagon and is connected by a suitable pipe 102$^b$ with said tank. Said recessed panels (see Fig. 4) are preferably made with their upper and lower extremities open, thus giving access of the air to the interior of the vehicle-body. Near said steam-pressure gage 102 is the gage 103 for indicating to the driver the pressure of air in the reservoir 56 and is connected therewith by a pipe 104. Below said air and steam gages is a dial 105, whereon is indicated in gallons or other unit of measure the quantity of liquid hydrocarbon in the tank 56, and the indicator-finger on this dial is operated mechanically by a float 106, (see Fig. 7,) attached by a rigid arm to the end of a shaft 107, extending from within the reservoir to the dashboard, and an arm 108 at the latter end is connected by a rod with one arm of an elbow-lever 109, (see Fig. 5,) the other arm of said lever being suitably connected by a vertical rod with the indicator-finger in any suitable way to swing the latter on its pivot, whereby its point will sweep over the face of a scale on the dial. Thus the rise and fall of the float 106 will actuate said finger to indicate the supply of fuel on hand. A small electric lamp is supported at some point from which it will illuminate the said gages and dial and is operated by a battery 110, wires from which run to said lamp and to a push-button 111 on the steering-lever 26. Said wires run inside of said lever for the sake of convenience in handling the latter. (See Fig. 13.)

As hereinbefore mentioned, the quantity of fuel permitted to enter the burner 44 is regulated by the pressure in the boiler, and thus said pressure is generated according to the requirements of the engine, and this regulation of the combustible is effected by placing a valve 112 in the pipe 113, which pipe (see Fig. 17) is exposed to the flame of the burner, whereby the hydrocarbon therein is vaporized. The stem of said valve 112 is connected with the flexible diaphragm inclosed in the case of a regulator 114, and the said case is connected with the steam-pipe 100. Thus a pressure in the boiler in excess of that under which said diaphragm will operate will cause the closure of the valve 112. The construction of the latter is such that the entire supply of vaporized fuel can never be entirely cut off, to the end that the flame of the burner may never be entirely extinguished; but said flame is so reduced in volume by the regulator that it is insufficient to cause the generation of steam in the boiler. The pipe 113 leads into the body of a needle-valve, through which said fuel enters the body of the burner.

The reversing-lever 115, Figs. 1, 3, and 4, is attached to a shaft $115^a$, whose inner end is supported near the engine, where by suitable connections with the valve mechanism of the engine the latter may be reversed. The throttle-lever 62 swings on the same axis as said reversing-lever and has a long hub 116, through which the shaft $115^a$ passes. Said hub of the throttle-lever extends some distance through the side wall of the body of the vehicle, and inside of the latter is embraced by a yoke 117, extending upward through the seat 118. (See Fig. 4.) The upper end of said yoke is attached to a flat spring 119, which normally is in the position shown in Fig. 4, and when the yoke is thus held in an elevated position a stud in the lower end thereof (see Fig. 10) engages a groove or slot in the said hub 116 and locks the latter against rotation, thus preventing the manipulation of the lever 62 when the driver is not on the seat of the vehicle. Said spring 119 is of such strength that the weight of a person on the seat will depress it and disengage the hub of the throttle-lever and the locking-yoke.

In Figs. 11 and 12 of the drawings are shown the details of construction of the differential gearing and the means for shifting from one speed to another, as hereinbefore referred to. It has been heretofore stated that the engine was connected with the sprockets on the rear axle by two chains running over the intermediate sprockets 31 and 32 (see Fig. 6) and that only one of the sprockets on the differential gearing was in driving connection therewith at a time, the other sprocket running loose. This differential gearing does not differ in principle from that form commonly employed, and 120 represents the driven member thereof. On the sides of said member are secured by screws the rings 121, and between the latter and the sides of said member are the sprockets 27 and 28 in the form of rings running in channels formed between said member 120 and said rings 121. An axially-registering hole 122 is bored transversely through said rings, said member 120, and said sprockets, and a pin 123 is located in said hole, said pin being of such length that when one end thereof engages one of said sprockets the opposite end thereof will be out of engagement with the other. When it is desired to shift from one speed to the other, the said pin is moved endwise out of engagement with one of said rings into engagement with the other. Suitable marks may be made on each sprocket over the hole therein which will indicate the location of the hole in the free sprocket to facilitate the alinement of said hole with the pin when it is desired to shift the latter. Said pin is notched, and a spring-actuated detent in the member 120 engages one of said notches and holds the pin in engagement with either of said sprockets. The ordinary brake-strap $122^a$ encircles the member 120, and one end thereof is fixed, and its opposite end may lead to a brake-lever of any well-known form, either foot or hand operated.

Reference has been made to the tubular connection on which the engine swings, whereby the chains which transmit power to the driving-axle of the vehicle may be adjusted. The construction of these parts is illustrated in Figs. 14 and 15. In Fig. 14 the rear side of the cylinder is shown having the steam-inlet ports 124, one to each cylinder, and an exhaust-port 125, common to both cylinders. The tubular member on which the engine is supported is hung in the bearings 40, and between the latter said member is divided by any suitable partition 127, and flanged branches 128 are provided in said member on the inlet side of said partition and another flanged branch 129 on the exhaust side of said partition. By suitable screws or bolts said flanged branches are secured to said cylinders over said steam and exhaust ports, and the ends of said member are united outside of said bearings with the steam-pipe 59 and the exhaust-pipe 69 by union-couplings 130, whereby the said tubular member may swing slightly independent of said steam and exhaust pipes.

In Fig. 16 is shown, on an enlarged scale, a plan view of the Y-shaped lever 24 attached to the steering-post 25. On a part of the bracket supporting said post are two lugs located near the latter and adapted to receive the screws 131, having proper check-nuts thereon. On said lever 24 are two shoulders 132, substantially radial to the steering-post 25 and which when the steering-lever 26 is thrown to one side or the other will come to a stop against the ends of said screws 131 before the wheels can be swung around far enough to strike the body of the vehicle. By still further limiting the throw of the steering-lever it is possible to guard against the danger of upsetting the vehicle by the too sudden turning of the steering-lever by a novice.

The vapor-burner hereinbefore referred to is illustrated in Figs. 17 and 18 of the drawings. This burner is of the type best adapted to the uses of steam-generators in automobile vehicles, and while this is the burner preferred another having similar characteristics may be used. The construction of this burner does not form part of this invention, as already stated, but a brief description thereof is necessary to a proper understanding of the requirements of a burner to be used in connection with the generator of an automobile vehicle. The burner-body, which is a receiver for the vaporized hydrocarbon, is indicated by the numeral 44 and may be of any shape adapted to conform with the shape of the generator under which it is placed. Draft-flues 134 pass through said body, but do not communicate therewith. Close to and encircling the orifice of said flues on the top of the burner are located the burner-tips 135. These may be of any desired number and a small hole passing lengthwise therethrough communicates with the interior of the receiver. The flame issuing from the tips receives the air from said flues necessary to combustion. The space between the top of the burner and the bottom of the generator is entirely inclosed to prevent cross-drafts, and on the under side of the burner sheets of perforated metal 136 are located, through which air to support combustion may freely pass induced by the heat above the burner; but said sheets will prevent any sudden puffs of air through the flues, which when the flames of the tips are reduced might extinguish them. Vaporized hydrocarbon is supplied to said burner-tips by said pipe 113, which is placed in coil form over the burner a slight distance above the flames and by which it is heated. This pipe is connected at one end to the burner through the said valve 112, and its opposite end is connected with the pipe 57, a valve 137 being located in the latter pipe in proximity to the burner. (See Figs. 3 and 7.) A trough 138 is located under a part of said pipe 113 over the burner, and an opening 139 is made through the casing which closes the space between the burner and the bottom of the boiler, through which alcohol or some similar combustible may be introduced into the trough 138 to produce the primary volatilization of a small amount of hydrocarbon admitted to said pipe 113 when it is desired to start the burner. Said opening 139 is tightly closed by a swinging door 140. The said trough contains a sufficient amount of fuel to fill the body of the burner with enough vaporized fuel to heat the said pipe 113 to a degree sufficient to vaporize a full and continuous supply for the burner, it being only necessary to open the valve in the pipe 57 only as fast as the primary evaporation will permit, to the end that no liquid fuel may pass through said pipe 113 into the body of the burner. Suitable devices 141 for admitting air to said receiver are located between the latter and the valve 112. From the preceding description of this construction it is seen that all of the disadvantages pertaining to the use of steam as a motive force for automobile vehicles have been overcome and the principal functions of the engine and boiler have been made to take place automatically. These functions are precisely those which heretofore have made it necessary to employ a skilled engineer in steam-driven vehicles and have stood in the way of the introduction of steam as a motive power for vehicles which are run on the public roads and are driven in a great majority of cases by persons who perhaps know almost nothing about mechanics, either in theory or construction.

The machine forming the subject of this application is so nearly automatic in its operation that it will practically take care of itself, provided it is furnished, as needed, water for the boiler and fuel by which that water may be converted into steam. Thus the functions of a driver may be reduced to the filling of the water and fuel tanks and a capacity to steer the vehicle. As long as there is a supply of water and fuel the steam-pressure in the boiler will be maintained at normal pressure when the vehicle is not in use and without the intervention of the driver. For instance, should the vehicle be left standing for an hour or more, no steam being required for the engine, as soon as maximum pressure is reached the automatically-operated valve 112 will be closed by the diaphragm-regulator, reducing the flame of the burner to minimum. As the water in the boiler falls below its normal level the thermally-actuated devices operate to open the valve 85 in the steam-pipe 51, which will start the feed-pump and cause water to be drawn from the tank 45 and forced into the boiler until the normal water-level has been restored; when by the means described the steam will be cut off from the feed-pump. This operation will be automatically repeated as long as water and fuel remain in the supply-tanks, and as under such conditions no steam is needed for the engine only a very small amount of either fuel or water will be required to maintain normal steam-pressure for a considerable length of time, the vehicle being always ready to start by simply opening the throttle-valve. The air-pressure in the fuel-tank is also maintained automatically as long as steam-pressure enough remains in the boiler to actuate the air-pump.

We do not claim herein the combination, with an automobile vehicle, of a pivotally-supported propelling-engine, a brace between the crank-shaft of the engine and the axle, a sprocket on the axle and a crank-shaft, a drive-chain engaging said sprockets, and means for lengthening and shortening the brace, whereby the engine may be swung for tightening and loosening the chain.

Having thus described our invention, what we claim, and desire to secure by Letters Patent of the United States, is—

1. In a motor-vehicle, the vehicle-body composed of sheets of metal containing flutes oppositely disposed, metallic pipes located within these flutes, and a steam boiler and engine with which said pipes are connected, whereby the pipes and fluted body mutually support each other, in combination, substantially as described.

2. In a motor-vehicle, the body supported on suitable springs and running-gear, the frame consisting essentially of two diagonally-arranged tubular members on each side, the axles connected to said diagonal members, and a flexible connection from said tubular members to some part of the engine, to permit a water, steam or air circulation through the frame, while permitting the frame to yield relatively to the running-gear, all combined substantially as described.

3. In a motor-vehicle, the frame composed essentially of two oppositely-arranged tubular communicating members at each side of said frame, brace connections at the centers and tubular connections at the divergent ends of such diagonally-arranged members, and a flexible connection from the tubes thereof to the steam-drum, all combined substantially as described.

4. In a motor-vehicle, the frame having two diagonally-arranged tubes at each side, connections between the rear ends and braces between the central portions of said tubes, and a perforated tube connecting the forward ends of said diagonal tubes, combined with supply-tubes whereby exhaust-steam is conveyed to the diagonally-arranged tubes, and the tubular frame is made a condenser for exhaust-steam, all substantially as described.

5. In a motor-vehicle, the frame having two diagonally-disposed tubular members at each side a connection from the steam-drum to the front of two of said diagonal members, connections between each pair of diagonal tubes at the rear, and a perforated tubular connection between the diagonal members at the front of the vehicle, all combined substantially as described.

6. In a motor-vehicle, the diagonally-disposed tubular members made in sections and loosely secured to the central cross-coupling for each pair, combined with the axles and body, substantially as described, whereby torsional movement of the frame is permitted, substantially as described.

7. The combination of the diagonally-arranged members, the central connection from each pair permitting torsional movement, the axles, and truss-frames connected to the axles and inclining upwardly and inwardly therefrom, longitudinal connections from said truss-frames, and the springs and body supported from said longitudinal connections, all substantially as described.

8. In a motor-vehicle, the axles, the body supported on suitable springs and running-gear, the frame having tubular members arranged at the sides and extending substantially from the front to the rear axle and having rigid supporting connections to the axles, and a yielding tubular connection from some part of the engine for passing a gas through said tubular members, to permit a circulation within and condensation by said tubular members, all combined substantially as described.

9. In a motor-vehicle, a divided axle connected to the driving-wheels, a yoke supporting said axle-sections, gears connected to the proximate ends of the axle-sections, driving-gears of different diameters having mechanical connections by which only one at a time may be connected to the axle-gears, and driving connections from the engine by which, through an intermediate, the one or the other axle-driving gear may be actuated, all combined substantially as described.

10. In a motor-vehicle, a divided driving-axle and differential gears connected thereto, a fork connected to the axle-support and inclosing driving-gears operatively connected to the gears on the axle, a driving-engine pivotally supported on the frame and operatively connected to said driving-gears, whereby provision is made for the swinging of the engine in the direction of the length of the frame, to regulate tension on the driving-gears, substantially as described.

11. In a motor-vehicle, the diagonally-arranged side members the axle and truss-frames, differential gears connected to the separate parts of the driving-axle, an engine yieldingly mounted on the frame and having yielding connections to the differential driving-gears, whereby torsion and yielding of parts are provided for, all combined substantially as described.

12. In a motor-vehicle, the driving-wheels and divided axle, the frame connected to said axle and having loose connections for torsion and yielding, motor-gears connected to the driving-gears on the axle, and a driving-engine supported by a swivel-joint on the frame through which joint the motor supply and exhaust from the engine pass, all combined substantially as described.

13. In an automobile vehicle, a propelling-engine pivotally supported on a tubular member through which the motive force for said engine may enter the cylinders thereof, and the exhaust find exit therefrom; said engine being adapted to swing on said member, whereby its crank-shaft may be moved toward or from the driving-axle of the vehicle, substantially as described.

14. The combination with the driving-axle of an automobile vehicle and a pivotally-supported engine for rotating said axle, a sprocket-wheel on the crank-shaft of said engine, a sprocket-wheel on the said driving-axle, a brace extending from said axle to said engine, a shaft having a sliding movement on said brace toward and from said axle, intermediate sprocket-wheels on said shaft, chains for said sprockets, and means for lengthening and shortening said brace for tightening all of said chains by one operation, substantially as described.

15. The combination in an automobile vehicle of a driving-axle therefor made in two parts, differential gearing uniting said parts, two sprocket-wheels on the driving member of said gearing, each of which sprockets is rotatable independently of said driving member, a pin in said member movable transversely thereof for engaging with either one of said sprockets for locking it to said member, substantially as described.

16. The combination with the body of a steam-propelled vehicle adapted to receive the propelling mechanism thereof, of a frame on which said body is supported and which comprises two groups of longitudinal and transverse tubes located one on each side of a central longitudinal line; a continuous passage through each of said groups, a pipe into which one end of each of said groups is connected, and a pipe connected with the opposite ends of said groups and with the propelling mechanism for receiving exhaust-steam therefrom, substantially as described.

17. The combination with the driving mechanism of an automobile vehicle, of a manually-operated starting device, and a seat connected to the starting device to lock the same against manipulation except when the seat is occupied, substantially as described.

18. In an automobile vehicle, the driving-motor, the starting-lever by which said motor is controlled, a grooved hub connected to said starting-lever, the seat and a spring tending to lift the same, and a projection connected to the seat-lifting spring, and engaging the hub to lock the operating-lever save when the seat is depressed, substantially as described.

19. In an automobile vehicle having a suitable propelling-engine, the combination with the starting member of said engine, of a locking device therefor normally in operative engagement with said member, and means connected with the seat of said vehicle whereby the weight of a person on said seat will disengage said locking device from said member and permit the actuation of the latter, substantially as described.

20. The combination with the elastically-supported body of a steam-propelled vehicle adapted to contain the propelling mechanism therefor, and a tubular frame rigid with the axles on which said body is movably supported, of a flexible pipe connecting said propelling mechanism with said tubular frame, whereby freedom of movement of said vehicle-body relative to said frame is permitted, and whereby exhaust-steam from said mechanism may be passed through said frame before escaping into the air, substantially as described.

21. In a motor-vehicle, a tubular frame supporting a steam-boiler and a water-tank with air-space between, an exhaust-drum supported on the tubular frame and connected thereto, whereby the frame serves as a condenser, and supply-pipes carried by the frame and leading through the exhaust-drum, substantially as described.

22. In a motor-vehicle, and in combination with the liquid-fuel supply and combustion apparatus, an air-pump and driving means therefor, a spring-actuated valve controlling the normal air-pressure from said pump, and means for disconnecting the controlling-valve so that the pump may develop abnormal pressure to charge the wheel-tires, substantially as described.

23. In a motor-vehicle, the body covered by sheet metal, the boiler, a gage on the boiler, and a recessed panel in the body of the vehicle within which said gage is located in proximity to the front of the vehicle-body, substantially as described.

24. In a motor-vehicle, an indicator-gage facing the operator's seat, an electric lamp near said gage, and battery connections from said lamp to an operating-button on the steering-lever, whereby the hand on the lever may operate the lamp to illuminate the gage without loosing the hold on the steering-lever, substantially as described.

25. In a motor-vehicle, the starting-valve and its lever, and a spring-lifted device engaging said lever to lock the same when the driver's seat is unoccupied, and a seat or support on which the driver's weight rests when in usual operating position, said seat when weighted disengaging the valve-locking device so that the valve may be moved, all combined substantially as described.

ALBERT H. OVERMAN.
JAMES HUBERT BULLARD.

Witnesses:
 WM. H. CHAPIN,
 K. I. CLEMONS.